United States Patent
Sueyoshi et al.

(10) Patent No.: US 8,479,190 B2
(45) Date of Patent: Jul. 2, 2013

(54) MANAGEMENT SYSTEM, MANAGEMENT METHOD, TERMINAL DEVICE, MANAGEMENT SERVER AND PROGRAM

(75) Inventors: Masahiro Sueyoshi, Kanagawa (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1175 days.

(21) Appl. No.: 12/014,321

(22) Filed: Jan. 15, 2008

(65) Prior Publication Data
US 2008/0178171 A1   Jul. 24, 2008

(30) Foreign Application Priority Data
Jan. 23, 2007   (JP) ................................ P2007-012898

(51) Int. Cl.
G06F 9/44       (2006.01)
G06F 9/445      (2006.01)
G06F 15/173     (2006.01)
G06F 13/00      (2006.01)
G06F 11/30      (2006.01)
G06F 7/04       (2006.01)
H04L 29/06      (2006.01)

(52) U.S. Cl.
USPC ........... 717/171; 717/168; 717/174; 709/223; 711/103; 713/153; 713/191; 719/328; 726/3

(58) Field of Classification Search
None
See application file for complete search history.

(56) References Cited

U.S. PATENT DOCUMENTS

| | | | | |
|---|---|---|---|---|
| 5,268,928 A | * | 12/1993 | Herh et al. | 375/222 |
| 5,781,921 A | * | 7/1998 | Nichols | 711/115 |
| 5,954,797 A | * | 9/1999 | Sidey | 709/223 |
| 6,640,334 B1 | * | 10/2003 | Rasmussen | 717/171 |
| 6,971,095 B2 | * | 11/2005 | Hirai et al. | 717/173 |
| 7,007,077 B1 | * | 2/2006 | Shinohara et al. | 709/220 |
| 7,043,664 B1 | * | 5/2006 | Chiloyan | 714/5.11 |
| 7,376,870 B2 | * | 5/2008 | Kataria et al. | 714/47.1 |
| 7,634,651 B1 | * | 12/2009 | Gerde et al. | 713/153 |
| 2003/0051160 A1 | * | 3/2003 | Selkirk et al. | 713/201 |
| 2003/0093571 A1 | * | 5/2003 | Oshima | 709/248 |
| 2005/0086654 A1 | * | 4/2005 | Sumi et al. | 717/171 |
| 2005/0102685 A1 | * | 5/2005 | Hariharan et al. | 719/328 |
| 2005/0144612 A1 | * | 6/2005 | Wang et al. | 717/168 |
| 2005/0186952 A1 | * | 8/2005 | Kitajima | 455/419 |

(Continued)

FOREIGN PATENT DOCUMENTS

| | | |
|---|---|---|
| JP | 1-275142 | 11/1989 |
| JP | 6-230847 | 8/1994 |
| JP | 06-350791 | 12/1994 |
| JP | 10-116189 | 5/1998 |
| JP | 11-340889 | 12/1999 |
| JP | 2003-141063 | 5/2003 |
| JP | 2003-150450 | 5/2003 |

*Primary Examiner* — Don Wong
*Assistant Examiner* — Anibal Rivera
(74) *Attorney, Agent, or Firm* — Finnegan, Henderson, Farabow, Garrett & Dunner, L.L.P.

(57) ABSTRACT

There is provided a management system having a terminal device and a management server for managing terminal firmware of the terminal device. The terminal device includes: storing means storing the firmware to be capable of being updated by a user of the terminal device, and storing firmware version information to be incapable of being updated by the user; firmware updating means updating, on the basis of the version information, the firmware stored in the storing means with newer version firmware; and version information updating means updating the version information stored in the storing means with that of the updated firmware updated, and the management server includes: judging means judging, on the basis of the terminal firmware version information, a need or not to update the firmware; and transmitting means transmitting the newer version firmware to the terminal device if the firmware needs to be updated.

20 Claims, 7 Drawing Sheets

U.S. PATENT DOCUMENTS

| | | | |
|---|---|---|---|
| 2006/0007815 A1* | 1/2006 | Erickson et al. | 369/47.1 |
| 2006/0143475 A1* | 6/2006 | Herbert et al. | 713/191 |
| 2006/0200658 A1* | 9/2006 | Penkethman | 713/2 |
| 2006/0236095 A1* | 10/2006 | Smith et al. | 713/153 |
| 2006/0236325 A1* | 10/2006 | Rao et al. | 719/315 |
| 2006/0294111 A1* | 12/2006 | Matsuda et al. | 707/10 |
| 2007/0169093 A1* | 7/2007 | Logan et al. | 717/168 |
| 2008/0065816 A1* | 3/2008 | Seo | 711/103 |
| 2008/0098458 A2* | 4/2008 | Smith et al. | 726/3 |
| 2008/0127159 A1* | 5/2008 | Regenmorter | 717/168 |
| 2008/0178202 A1* | 7/2008 | Blackman et al. | 719/327 |
| 2008/0256530 A1* | 10/2008 | Armstrong et al. | 717/174 |

* cited by examiner

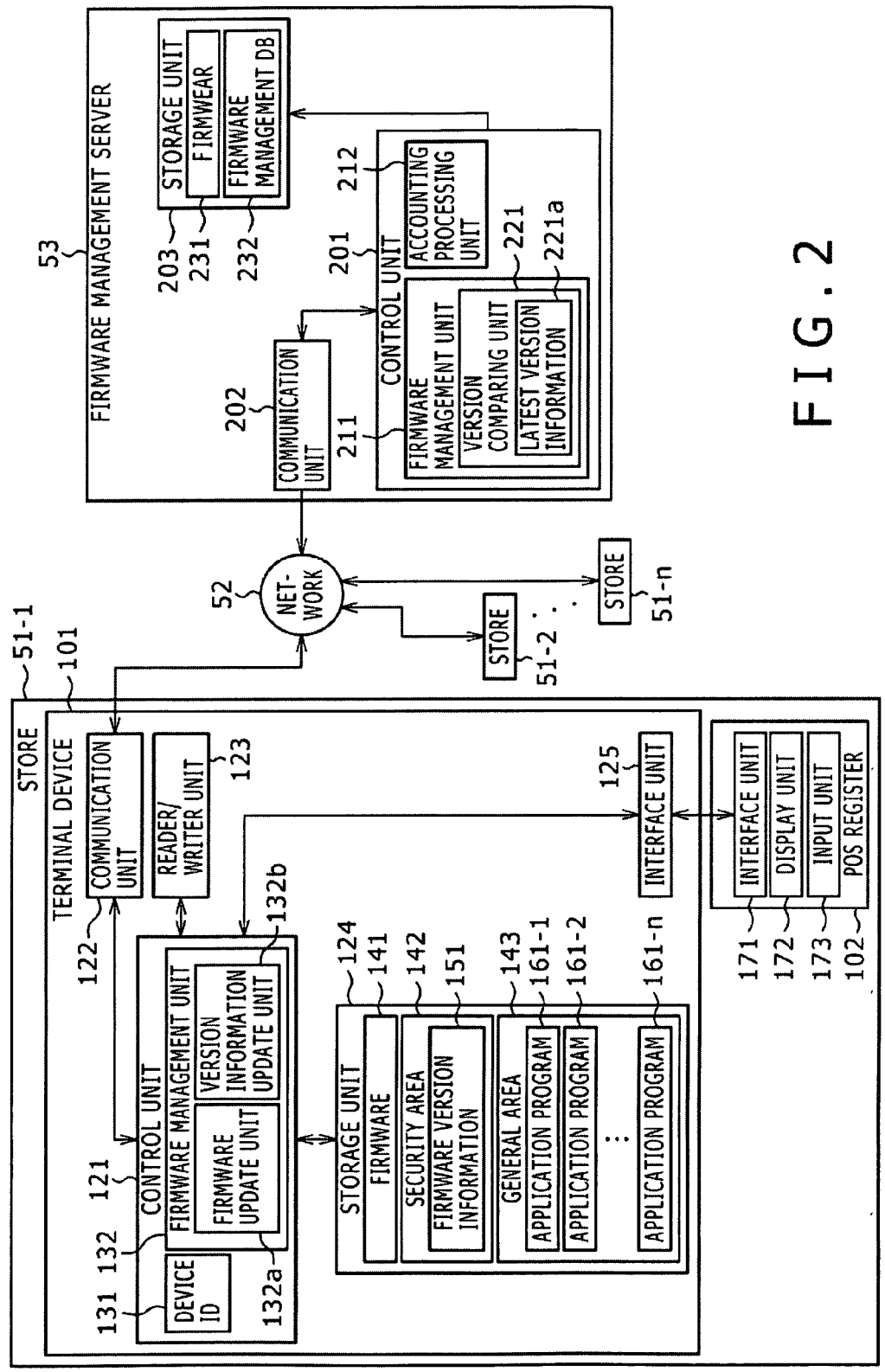
F I G. 2

FIG. 4

| DEVICE ID | SUPPORT CONTRACT INFORMATION | VERSION INFORMATION | ACCOUNTING MANAGEMENT INFORMATION |
|---|---|---|---|
| 1 | 1 | Version1-1 | 1 |
| 2 | 0 | — | 1 |
| 3 | 1 | Version2-1 | 0 |
| | | | |
| X | 1 | Version1-3 | 1 |

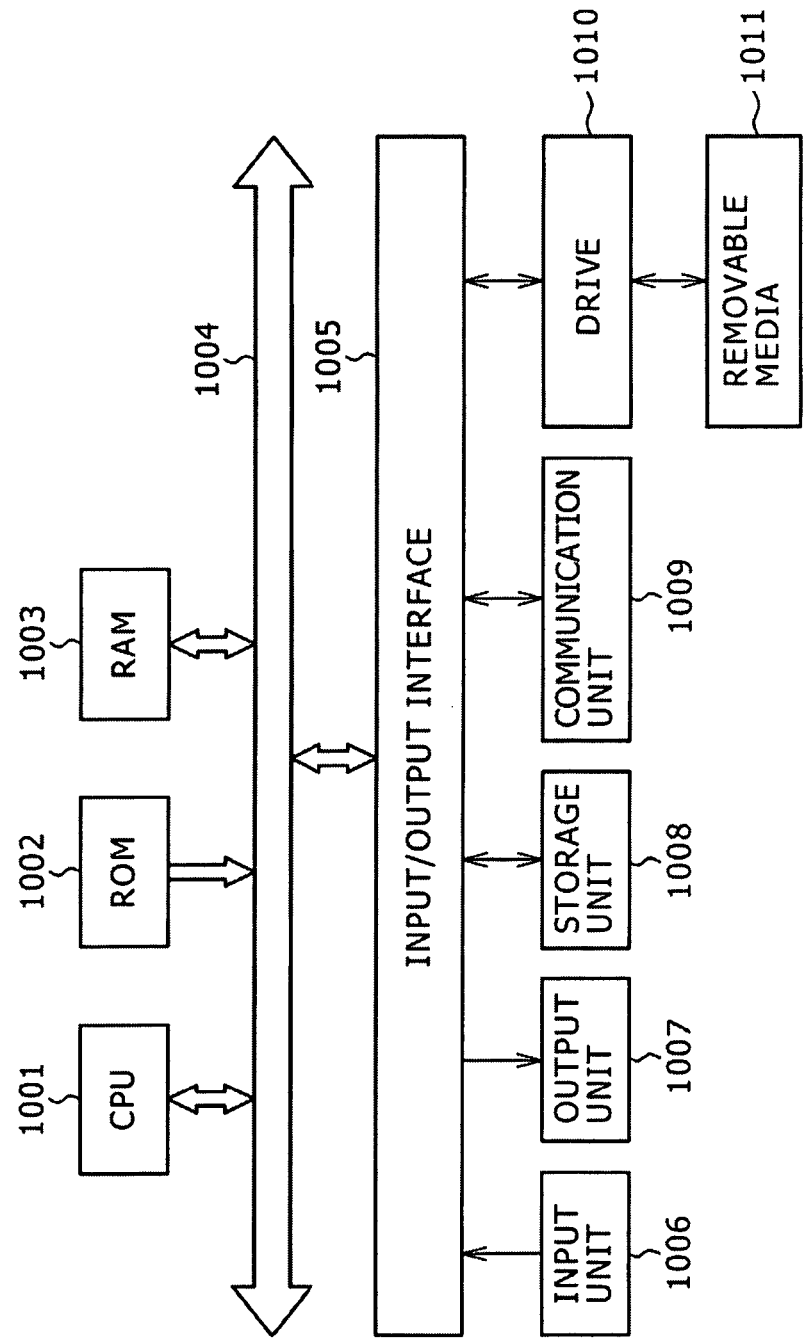

MANAGEMENT SYSTEM, MANAGEMENT METHOD, TERMINAL DEVICE, MANAGEMENT SERVER AND PROGRAM

BACKGROUND OF THE INVENTION

1. Field of the Invention

The present invention relates to a management system, a management method, a terminal device, a management server and a program, and more particularly, to a management system, a management method, a terminal device, a management server and a program, which are adaptable to accurately manage a firmware update condition.

2. Description of Related Art

In recent years, a card (an IC card) with a built-in IC (Integrated Circuit) chip is generally coming into wide use.

Such an IC card contains data such as accounting information in the built-in IC chip. Thus, for execution of an operation (updating) with respect to the data contained in the IC card, a terminal device having an IC card reader/writer performs the operation to the data contained in the IC card, after connecting to a server adapted to distribute information to the terminal device and conducting mutual authentication between the terminal device having the IC card reader/writer and the server.

For instance, a technology applied to read out data from an IC card online is disclosed (See Japanese Patent Application Publication (KOKAI) 2003-141063).

The terminal device having the IC card reader/writer also contains an application program, and the application program contained is executed on firmware.

Such firmware is a basic program of the terminal device, and is changed to newer version firmware by updating, when newly additional functions are provided for the terminal device itself. With updating of the firmware, the terminal device allows application programs providing further advanced functions to be executed.

SUMMARY OF THE INVENTION

By the way, it becomes a matter of general knowledge that updating of the firmware is performed online.

FIG. 1 shows a firmware management system in a related art.

Each of stores 1-1 to 1-n has a terminal device 11 including a reader/writer unit 21 adapted to read out information from an IC card 13 or to record information onto the IC card 13. The same type of terminal device 11 is provided for each of the stores 1-1 to 1-n. An application program 22 is a program for implementation of processing suited to various types of IC cards 13, and implements processing corresponding to card issuance companies that have put the IC cards 13 in circulation. Firmware 23 is a basic program of the terminal device 11, and permits execution of the application program 22. It is noted that while there is shown use of a single application program 22 in FIG. 1, it is also allowable to use more than one application program. Thus, it is considered that increasing the number of application programs 22 causes an increase in types and/or functions of the adaptable IC cards 13.

A point of sale (POS) register 12 is a register used at the time of payment in the store. Specifically, in the payment involved in purchase of items, the POS register 12 accepts the payment on the basis of information of a sum charged in the IC card 13 through the terminal device 11. The POS register 12 also functions as an information input/output terminal used to control and manage the term-nal device 11. Specifically, when a request to update the firmware 23 is made, for instance, the POS register 12 is operated to send, on the basis of information suited to the operation contents, a request for version-up (distribution) of the firmware 23 to a firmware management server 3 through a network 2.

The firmware management server 3 is a server operated by a firmware development/management proprietor, and is connected to the terminal device 11 of each of the stores 1-1 to 1-n through the network 2 such as the Internet to perform distribution of the firmware.

Actions of the firmware management system shown in FIG. 1 are now described.

First, if a command to the effect that updating of the firmware is requested is inputted through an operation of the POS register 12 by a clerk (a user) in charge of the store 1-1, a request for version-up of the firmware 23 is sent to the firmware management server 3 through the network 2.

In response to the version-up request, the firmware management server 3 distributes the latest firmware to the store 1-1 through the network 2.

In accordance with this processing, the terminal device 11 receives the firmware distributed from the firmware management server 3 through the network 2 to update the firmware 23 with new version firmware by overwriting, leading to the end of the processing.

In the related art, the firmware has been updated by the above processing.

On the grounds that updating (version-up) of the firmware 23 is performed as described above, the firmware management server 3 has only to permit the firmware 23, inclusive of the firmware 23 in each of the stores 1-2 to 1-n, to be updated sequentially at a stretch. However, the firmware is supposed to be updated only when the terminal device 11 of each store 1 makes the firmware version-up request, so that updating of the firmware 23 is not always attainable with respect to the terminal devices 11 in all the stores 1-1 to 1-n. For that reason, it becomes difficult to grasp whether or not the terminal device 11 of which of the stores 1-1 to 1-n gives effect to updating of the firmware 23. Consequently, the management proprietor of the firmware management server 3 fails to grasp the store or stores having performed updating of the firmware 23 among the stores 1-1 to 1-n, although the cost must go into the development and/or management of the firmware, resulting in a difficulty in making compensation for expenses involved in the firmware development.

The present invention has been undertaken in view of the above circumstances, and is particularly intended to accurately grasp a customer-by-customer firmware update condition to permit processing such as accounting to be performed depending on a store-by-store (terminal device-by-terminal device) update condition of firmware, while performing distribution of the firmware only to a terminal device to be updated.

A management system in a first aspect of the present invention relates to a management system having a terminal device and a management server adapted for management of terminal firmware of the above terminal device. The terminal device includes storing means, firmware updating means and version information updating means. The storing means stores the firmware to be capable of being updated by a user of the terminal device, and stores version information of the firmware to be incapable of being updated by the user. The firmware updating means updates, on the basis of the version information, the firmware stored in the storing means with newer version firmware transmitted from the management server. The version information updating means updates the version information stored in the storing means with version information of the firmware updated by the firmware updating means. The management server includes judging means and transmitting means. The judging means judges, on the basis of the version information of the terminal firmware transmitted from the terminal device, a need or not to update the firmware. The transmitting means transmits the newer version firmware to the terminal apparatus if it is judged by the judging means that the firmware needs to be updated.

The storing means is allowed to store the firmware version information in a security area where updating of the version information by the user of the terminal device is inhibited. The version information updating means is allowed to update the version information stored in the security area of the storing means with the version information of the firmware updated by the firmware updating means.

With respect to the management server, if it is judged by the judging means that the firmware needs to be updated, the transmitting means is allowed to transmit the firmware version information, which is aimed at being transmitted, to the terminal device together with the firmware, after encryption of the above firmware version information with a secret key of one's own management server. With respect to the terminal device, the version information updating means is allowed to update the firmware version information with the encrypted version information. The storing means is also allowed to perform, by storing the version information in an encrypted state, storage of the version information so as to inhibit the stored version information from being updated by the user of the terminal device.

A management method of a management system according to the first aspect of the present invention relates to a management method of a management system having a terminal device and a management server adapted for management of firmware of the terminal device. The management method applied to the terminal device includes a storing step, a firmware updating step and a version information updating step. The storing step is to store the firmware in a condition that a user of the terminal device can update the firmware, while storing version information of the firmware in a condition that the user cannot update the stored version information. The firmware updating step is to update, on the basis of the version information, the firmware stored by processing in the storing step with newer version firmware transmitted from the management server. The version information updating step is to update the version information stored by processing in the storing step with version information of the firmware updated by processing in the firmware updating step. The management method applied to the management server includes a judging step and a transmitting step. The judging step is to judge, on the basis of the version information of the terminal firmware transmitted from the above terminal device, a need or not to update the firmware. The transmitting step is to transmit the newer version firmware to the terminal device if it is judged by processing in the judging step that the firmware needs to be updated.

A program in the first aspect of the present invention is adapted to cause, among computers for controlling a management system having a terminal device and a management server adapted for management of firmware of the terminal device, a computer for controlling the terminal device to perform processing including a storing step, a firmware updating step and a version information updating step, while causing a computer for controlling the management server to perform processing including a judging step and a transmitting step. The storing step is to store the firmware in a condition that a user of the terminal device can update the firmware, while storing version information of the firmware in a condition that the user cannot update the stored version information. The firmware updating step is to update, on the basis of the version information, the firmware stored by processing in the storing step with newer version firmware transmitted from the management server. The version information updating step is to update the version information stored by processing in the storing step with the version information of the firmware updated by processing in the firmware updating step. The judging step is to judge, on the basis of the version information of the terminal firmware transmitted from the terminal device, a need or not to update the firmware. The transmitting step is to transmit the newer version firmware to the terminal device if it is judged by processing in the judging step that the firmware needs to be updated.

A program recording medium according to the first aspect of the present invention contains a program as described in the above-mentioned program according to one embodiment of the present invention.

A terminal device according to a second aspect of the present invention includes storing means, firmware updating means and version information updating means. The storing means stores firmware so as to permit the stored firmware to be updated by a user of one's own terminal device, while storing version information of the firmware so as to inhibit the stored version information from being updated by the user. The firmware updating means updates, on the basis of the version information, the firmware stored in the storing means with newer version firmware transmitted from a management server. The version information updating means updates the version information stored in the storing means with the version information of the firmware updated by the firmware updating means.

A management server according to a third aspect of the present invention includes judging means and transmitting means. The judging means judges, on the basis of the version information of terminal firmware transmitted from a terminal device, a need or not to update the firmware. The transmitting means transmits the newer version firmware to the terminal device if it is judged by the judging means that the firmware needs to to be updated.

With respect to the management system, the management method and the program according to the first aspect of the present invention, the terminal device is adaptable to ensure that the firmware is stored so as to permit the stored firmware to be updated by the user of the terminal device, the version information of the firmware is stored so as to inhibit the stored version information from being updated by the user, the stored firmware is updated, on the basis of the version information, with the newer version firmware transmitted from the management server, and the stored version information is updated with the updated firmware version information. The management server is adaptable to ensure that the need or not to update the firmware is judged on the basis of the version information of the terminal firmware transmitted from the terminal device, and the newer version firmware is transmitted to the terminal device if it is judged that the firmware needs to be updated.

With respect to the terminal device according to the second aspect of the present invention, it is ensured that the firmware is stored so as to permit the stored firmware to be updated by the user of one's own terminal device, the version information of the firmware is stored so as to inhibit the stored version information from being updated by the user, the stored firmware is updated, on the basis of the version information, with the newer version firmware transmitted from the management server, and the stored version information is updated with the version information of the updated firmware.

With respect to the management server according to the third aspect of the present invention, it is ensured that the need or not to update the firmware is judged on the basis of the version information of the terminal firmware transmitted from the terminal device, and the newer version firmware is transmitted to the terminal device if it is judged that the firmware needs to be updated.

The management system, the terminal device and the management server according to the present invention may be in independent arrangements, or alternatively, in the form of a block adapted to perform management processing.

These and other features and aspects of the invention are set forth in detail below with reference to the accompanying drawings in the following detailed description of the embodiments.

BRIEF DESCRIPTION OF THE DRAWINGS

FIG. 2 is a view showing an embodiment of a firmware management system to which the present invention is applied;

FIG. 4 is a view showing a firmware management DB;

FIG. 7 is a view showing one configuration of a personal computer.

DETAILED DESCRIPTION OF EMBODIMENTS

Figure 1:
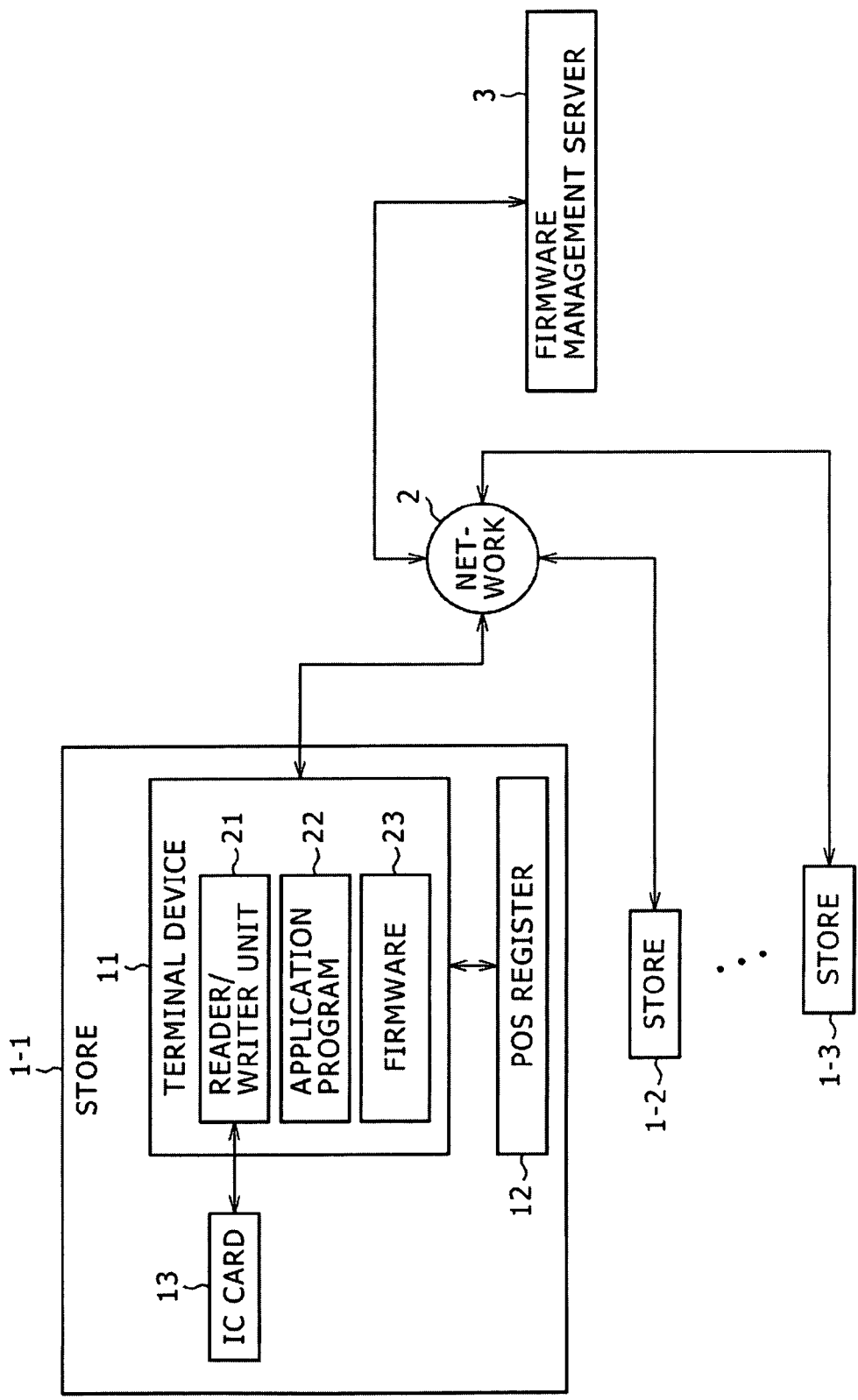
FIG. 1 is a view showing an outer appearance of one configuration of a firmware management system in a related art.

While embodiments of the present invention are described in the following, a correspondence relation between subject matters set forth in this specification and the embodiments of the invention is illustrated as follows. The following description is to confirm that the embodiments to support the subject matters set forth in this specification are also set forth in this specification. Thus, granting that there are some specific instances that are not set forth herein as those corresponding to the subject matters, although being set forth in the embodiments of the invention, this fact does not imply that these specific instances are not specified as those corresponding to the subject matters. Conversely, granting that the specific instances are set forth herein as those corresponding to the subject matters, this fact does not imply too that these specific instances are specified as those supposed to be not corresponding to any subject matters other than the above.

Further, the following description is not given as that making a suggestion that the subject matters corresponding to the specific instances set forth in the embodiments of the invention are all set forth in this specification. In other words, the following description is not given as that denying the existence of the subject matters that are not set forth in Claims of the present application, although being specified as those corresponding to the specific instances set forth in the embodiments of the invention, that is, prospective subject matters for a divisional application or an additional application by an amendment in the future.

That is, a management system in a first aspect of the present invention relates to a management system having a terminal device (a terminal device 101 shown in FIG. 2, for instance), and a management server (a firmware management server 53 shown in FIG. 2, for instance) adapted to management of terminal firmware of the terminal device. The terminal device includes storing means (a storage unit 124 shown in FIG. 2 or 5, for instance), firmware updating means (a firmware update unit 132a shown in FIG. 2 or 241a shown in FIG. 5, for instance) and version information updating means (a version information update unit 132b shown in FIG. 2 or 241b shown in FIG. 5, for instance). The storing means stores the firmware so as to permit the stored firmware to be updated by a user of the terminal device, while storing version information of the firmware so as to inhibit the stored version information from being updated by the user. The firmware updating means updates, on the basis of the version information, the firmware stored in the storing means with newer version firmware transmitted from the management server. The version information updating means updates the version information stored in the storing means with version information of the firmware updated by the firmware updating means. The management server includes judging means (a version comparing unit 221 shown in FIG. 2, for instance) and transmitting means (a communication unit 202 shown in FIG. 2 or 5, for instance). The judging means judges, on the basis of the version information of the terminal firmware transmitted from the terminal device, a need or not to update the firmware. The transmitting means transmits the above newer version firmware to the terminal device if it is judged by the judging means that the firmware needs to be updated.

The storing means (the storage unit 124 shown in FIG. 2, for instance) is allowed to store the firmware version information in a security area (a security area 142 shown in FIG. 2, for instance) where updating of the version information by the user of the terminal device is inhibited. The version information updating means is also allowed to update the version information stored in the security area of the storing means with the version information of the firmware updated by the firmware updating means.

With respect to the management server, if it is judged by the judging means that the firmware needs to be updated, the transmitting means is allowed to transmit the firmware version information, which is aimed at being transmitted, to the terminal device together with the firmware, after encryption of the version information with a secret key (a secret key 291 shown in FIG. 5, for instance) of one's own management server. With respect to the terminal device, the version information updating means is allowed to update the firmware version information with the encrypted version information (an electronic certificate 261 shown in FIG. 5, for instance). The storing means (the storage unit 124 shown in FIG. 5, for instance) is also allowed to perform, by storing the version information in the encrypted state, storage of the version information so as to inhibit the stored version information from being updated by the user of the terminal device.

A management method of a management system in the first aspect of the present invention relates to a management method of a management system having a terminal device and a management server for managing firmware of the terminal device. The management method applied to the terminal device includes a storing step (Steps S10 and S11 shown in FIG. 3, for instance), a firmware updating step (Step S10 shown in FIG. 3, for instance) and a version information updating step (Step S11 shown in FIG. 3, for instance). The storing step is to store the firmware so as to permit the stored firmware to be updated by a user of the terminal device, while storing version information of the firmware so as to inhibit the stored version information from being updated by the user.

The firmware updating step is to update, on the basis of the version information, the firmware stored by processing in the storing step with newer version firmware transmitted from the management server. The version information updating step is to update the version information stored by processing in the storing step with version information of the firmware updated by processing in the firmware updating step. The management method applied to the management server includes a judging step (Step S28 shown in FIG. 3, for instance) and a transmitting step (Step S30 shown in FIG. 3, for instance). The judging step is to judge, on the basis of the version information of the terminal firmware transmitted from the terminal device, a need or not to update the firmware. The transmitting step is to transmit the newer version firmware to the terminal device if it is judged by processing in the judging step that the firmware needs to be updated.

FIG. 2 shows a configuration of one embodiment of a firmware management system to which the present invention is applied.

Each of stores 51-1 to 51-n has a terminal device 101 which accepts payment by an IC card. The terminal device 101 of each of the stores 51-1 to 51-n also sends a firmware version-up (update) request to the firmware management server 53 through a network 52, and at the same time, acquires and updates the firmware distributed in response to the request. In the following description, it is noted that unless otherwise specified, the stores 51-1 to 51-n are simply referred to as a store 51, and the same is also true for other configurations.

The terminal device 101 is connected to a point of sales (POS) register 102. Thus, in the payment of a sum corresponding to an item price after input of the item price with the POS register 102, the terminal device 101 performs payment processing by reading out accounting information recorded (charged) in the above non-illustrated IC card (the equivalent of an IC card 13 shown in FIG. 1), and at the same time, records, in the non-illustrated IC card, the accounting information left over after the payment.

A control unit 121 of the terminal device 101 performs management of an overall action of the terminal device 101 on the basis of an operating signal supplied from an input unit 173 such as a keyboard of the POS register 102 through an interface unit 125. The terminal device 101 controls, on the basis of the operating signal supplied from the input unit 173 through the interface unit 125, a reader/writer unit 123 to read out the accounting information from the IC card, and at the same time, supplies the accounting information to the POS register 102 through the interface unit 125 to cause the accounting information to be displayed on a display unit 172 configured with a LCD (Liquid Crystal Display), etc.

The control unit 121 also controls a communication unit 122 configured with a network interface, etc. to transfer various data between the terminal device and the firmware management server 53 through the network 52. Further, the control unit 121 allows, by implementation of firmware 141 specified as a basic program stored in the storage unit 124 configured with a hard disk and a flash memory, etc., application programs 161-1 to 161-n stored in a general area of the storage unit 124 to be executed on the firmware 141.

A device ID 131 unique to each terminal device 101 is stored in the control unit 121. If version-up of the firmware 141 is commanded through an operation of the input unit 173 of the POS register 102, a firmware management unit 132 of the control unit 121 reads out the device ID 131, and at the same time, reads out firmware version information 151 stored in the security area 142 inhibited from being handled (or recognized) by the user of the terminal device 101, among the areas in the storage unit 124, followed by controlling the communication unit 122 to send the firmware version-up request to the firmware management server 53 through the network 52.

If the latest firmware (or firmware whose version information is newer) is distributed from the firmware management server 53 in response to the firmware version-up request, the firmware management unit 132 controls the firmware update unit 132a to update the firmware 141 with newly supplied firmware 231 (stored in the storage unit 203 of the firmware management server 53). At this time, the version information update unit 132b performs access to the security area 142 to update the firmware version information 151 on the basis of the transmitted latest version information 221a of the firmware 231 together with the updated firmware 141.

The POS register 102 is composed of the input unit 173 configured with the keyboard, the display unit 172 configured with the LCD, and the interface unit 171. The interface unit 171 supplies, to the terminal device 101, the operating signal generated by operating the input unit 173, and at the same time, acquires various information supplied from the terminal device 101 to cause the acquired information to be displayed on the display unit 172. It is noted that because the terminal device 101 is incapable of accepting, by oneself, information input from the user, all the terminal device action takes place through the POS register 102.

A control unit 201 of the firmware management server 53 performs control of an overall operation of the firmware management server 53. If the terminal device 101 of the store 51 makes the firmware version-up request, the control unit 201 controls the communication unit 202 to acquire this version-up request, and at the same time, reads out the latest (or newer) firmware 231 from the storage unit 203 to transmit the read-out firmware to the terminal device 101 of the store 51 through the communication unit 202.

Upon receipt of the firmware version-up request from the terminal device 101, the control unit 201 supplies, to a firmware management unit 211, the firmware version information 151 contained in the received request. The firmware management unit 211 performs access to a firmware management DB 232 to judges, on the basis of the device ID, whether or not a contract to support the firmware 141 is included. That is, when the firmware version-up request is received, the firmware management unit 211 judges whether or not a contract to distribute the latest firmware is included. If included, the firmware management unit 211 controls the version comparing unit 221 to compare the latest version information 221a with the firmware version information 151. Then, if the latest version information 221a is not identical with the firmware version information 151, in other words, the firmware version information 151 is of a version older than the latest version information 221a of the latest firmware 231, the firmware management unit 211 performs access to the storage unit 203 to read out the latest firmware 231, followed by controlling the communication unit 202 to transmit the read-out firmware to the terminal device 101 presenting the firmware version-up request.

Figure 3:
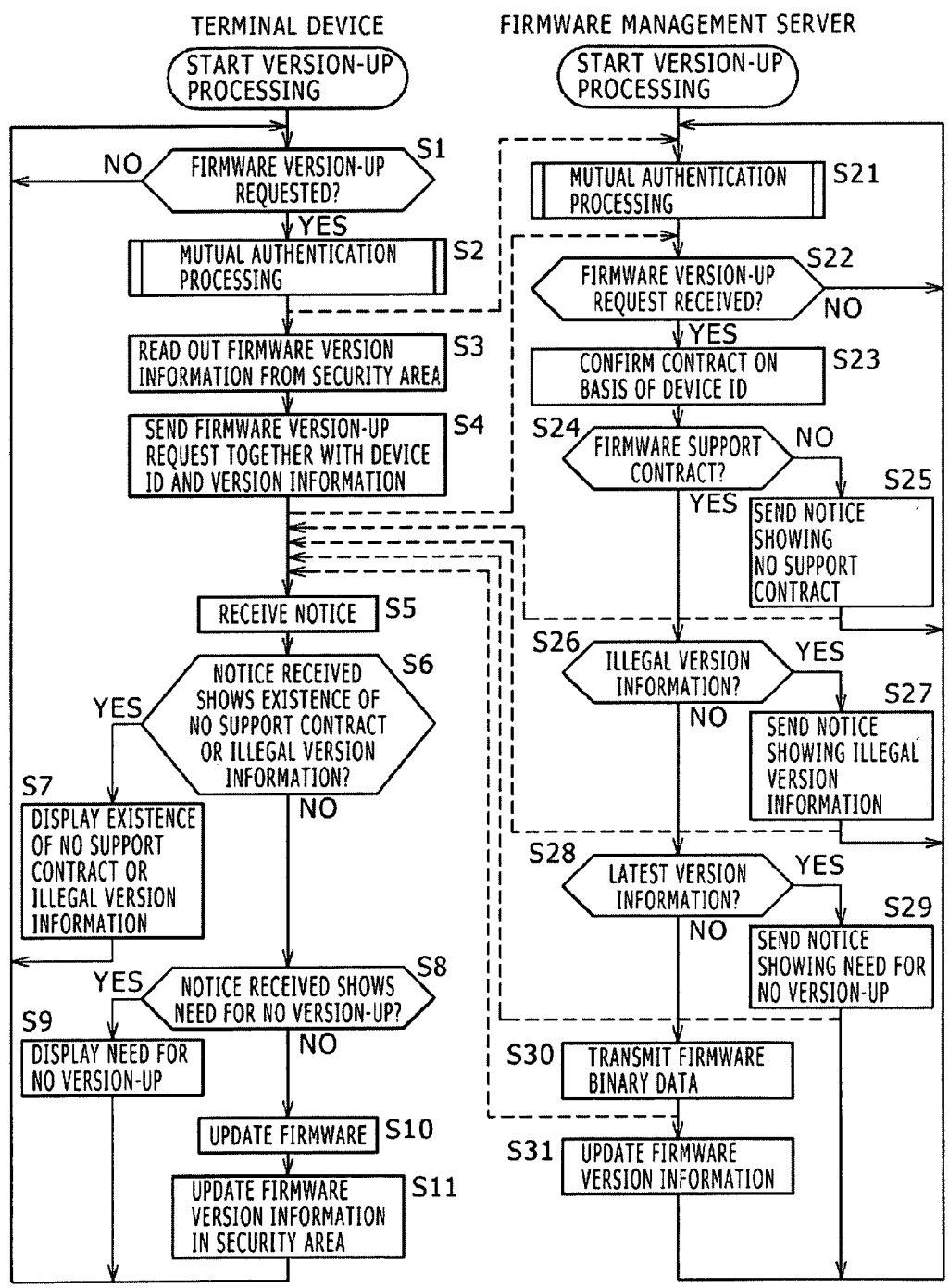
FIG. 3 is a flowchart for illustrating version-up processing with the firmware management system shown in FIG. 2.

Firmware version-up processing with the firmware management system shown in FIG. 2 is now described with reference to a flowchart in FIG. 3.

In Step S1, the control unit 121 controls the firmware management unit 132 to judge whether or not firmware version-up has been requested from the POS register 102 through the interface unit 125, or repeats the same processing until the firmware version-up is requested. Then, in the Step S1, if the firmware version-up request is commanded on the basis of the information on the display unit 172, through the operation of the input unit 173 by the user such as a clerk in charge of the store 51, the corresponding operating signal is generated. If the operating signal generated is supplied to the control unit 121 through the interface units 171 and 125, it is judged that the firmware version-up request has occurred, and the process goes to Step S2.

In the Step S2, the control unit 121 controls the communication unit 122 to perform mutual authentication processing with the firmware management server 53.

In accordance with the processing in the Step S2, the control unit 201 of the firmware management unit 53 also controls, in Step S21, the communication unit 202 to perform the mutual authentication processing.

If the mutual authentication processing is included in those adaptable to provide mutual authentication between the terminal device 101 and the firmware management server 53, an authenticating method is not limited, and may be those such as challenge-and-response or those using a secret key and a public key. If the above mutual authentication processing succeeds, the subsequent processing is started. It is noted that if the above mutual authentication processing fails, the processing is ended.

In Step S3, the firmware management unit 132 performs access to the security area 142, which is set in the storage unit 124 so as to inhibit data from being rewritten in response to the user's operation from the POS register 102 to read out the firmware version information 151 of the present firmware 141 from the above security area.

In Step S4, the firmware management unit 132 controls the communication unit 122 to send the firmware version-up request to the firmware management server 53 through the network 52, after appending the device ID 131 for identification of the terminal device 101 to the read-out firmware version-information 151.

In Step S22, the control unit 201 controls the communication unit 202 to judge whether or not the firmware version-up request has been received, or repeats the same processing until the firmware version-up request is received. If it is judged in the Step S22 that the firmware version-up request by the processing in the Step S4 has been received, the process goes to Step S23.

In the Step S23, the control unit 201 controls the firmware management unit 211 to gain access to the firmware management DB 232 stored in the storage unit 203, causing support contract information concerning the terminal device 101 presenting the firmware version-up request to be read out and confirmed on the basis of the device ID 131 transmitted together with the firmware version-up request.

The firmware management DB 232 is in the form of a database as shown in FIG. 4, for instance, which contains support contract information, version information and accounting management information each associated with the device ID. For the database shown in FIG. 4, the device ID, the support contract information, the version information and the accounting management information are on record from the left. The device ID has records in the order of 1, 2, 3, . . . and X from the top. The version information has records in the order of Version 1-1, -, Version 2-1, . . . and Version 1-3 from the top. The accounting management information has records in the order of 1, -, 0, . . . and 1 from the top. In FIG. 4, "1" is assigned to cases where the support contract is included, and "0" is assigned to cases where no support contract is included. As for the accounting management information, "1" is assigned to cases of payment received by processing in an accounting processing unit 212, and "0" is assigned to cases of accounting remaining unpaid.

That is, for a terminal device 101 corresponding to a device ID=1, it is shown that the support contract is included, the present version information is of Version 1-1, and management of the accounting is in effect. For a terminal device 101 corresponding to a device ID=2, it is shown that no support contract is included, the present version information remains unknown and is thus shown as "-" because management of the version information is not in effect, and the accounting remains unknown too and is thus shown as "-" because management of the accounting is not in effect. For a terminal device 101 corresponding to a device ID=3, it is shown that the support contract is included, the present version information is of Version 2-1, and management of the accounting is not in effect. For a terminal device 101 corresponding to a device ID=X, it is shown that the support contract is included, the present version information is of Version 1-3, and management of the accounting is in effect. In FIG. 4, it is noted that the order of the version information from the earliest is assumed to be Version 1-1, Version 1-2, Version 1-3, Version 2-1 . . . .

Thus, in such cases where the terminal device 101 with the device ID=2 causes the firmware version-up request, for instance, it is judged in Step S24 that "0" is taken for the support contract information. Thus, the firmware management unit 211 presumes that no support contract is included, and the processing is followed by Step S25. In the Step S25, the control unit 201 controls the communication unit 202 to send, to the terminal device 101, a notice showing that the version-up request fails to be accepted due to no support contract, and the processing goes back to the Step S21.

On the other hand, in such cases where the terminal device 101 with the device ID=1 causes the firmware version-up request, for instance, it is judged in the Step S24 that "1" is taken for the support contract information. Thus, the firmware management unit 211 presumes that the support contract is included, and the processing is advanced to Step S26.

In the Step S26, the firmware management unit 211 judges, by comparing the firmware version information 151 transmitted from the terminal device 101 with the version information read out from the firmware management DB 232, whether or not illegality is included. That is, the firmware version information 151 transmitted from the terminal device 101 ought to be normally identical with the version information read out from the firmware management DB 232. However, in such cases where the firmware version information 151 supposed to be managed in the security area 142 so as to inhibit the stored version information from being updated on the side of the terminal device 101 is falsified by some illegal means, both the version information may be not identical with each other. Thus, the firmware management unit 211 makes judgment as to whether or not the firmware version information 151 is illegal.

In the case of FIG. 4, for instance, when the firmware version information 151 from the terminal device 101 with the device ID=1 is of Version 1-2, because the firmware version information 151 (Version 1-2) transmitted from the terminal device 101 and the version information (Version 1-1) read out from the firmware management DB 232 are not identical with each other, it is judged in the Step S26 that the firmware version information 151 is illegal, and the processing is followed by Step S27.

In the Step S27, the firmware management unit 211 controls the communication unit 202 to send, to the terminal device 101, a notice showing that the firmware version-up request fails to be accepted due to the illegal firmware version information 151.

On the other hand, in the Step S26, in the case of FIG. 4, for instance, when the firmware version information 151 from the terminal device 101 with the device ID=1 is of Version 1-1, because the firmware version information 151 (Version 1-1) transmitted from the terminal device 101 and the version information (Version 1-1) read out from the firmware management DB 232 are identical with each other, it is presumed that the firmware version information 151 is not illegal, and the processing is advanced to Step S28.

In the Step S28, the firmware management unit 211 controls the version comparing unit 221 to judge, by comparing the firmware version information 151 transmitted from the terminal device 101 with the latest version information 221a specified as the version information of the firmware 231 stored in the storage unit 203, whether or not the firmware version information 151 is of the latest.

In the Step S28, if the latest version information is of Version 2-1, for instance, the firmware version information 151 is also of Version 2-1 when the terminal device 101 with the device ID=3 causes the firmware version-up request in the case of FIG. 4, so that the firmware version information 151 is identical with the latest version information 221a. As a result, it is presumed that the firmware version information 151 is of the latest, and the processing is followed by Step S29. In the Step S29, the control unit 201 controls the communication unit 202 to send, to the terminal device 101 making the firmware version-up request, a notice showing that no firmware version-up is needed, in other words, no firmware needs to be updated.

On the other hand, in the Step S28, if the latest version information is of Version 2-1, for instance, because the firmware version information 151 is of Version 1-1 when the terminal device 101 with the device ID=1 causes the firmware version-up request in the case of FIG. 4, it is presumed that the firmware version information 151 is earlier than the latest version information 221a, that is, the firmware version information 151 is not of the latest. In the Step S30, the firmware management unit 211 performs access to the storage unit 203 to read out the stored latest firmware 231 in the form of binary data, followed by controlling the communication unit 202 to transmit the read-out firmware to the terminal device 101 making the firmware version-up request. At this time, the firmware management unit 211 causes the latest version information 221a and information such as the time of acceptance of the firmware version-up request to be transmitted together with the latest firmware 231 in the form of binary data.

In Step S31, the firmware management unit 211 performs access to the storage unit 203 to update the firmware management DB 232 in accordance with the version-up of the firmware 141, and the processing goes back to the Step S21. That is, if the latest version information is of Version 2-1, for instance, the firmware 141 of the terminal device 101 with the device ID=1 is changed from Version 1-1 to Version 2-1 by means of firmware updating when the terminal device 101 with the device ID=1 causes the firmware version-up request in the case of FIG. 4.

By the way, with respect to the terminal device 101, the firmware management unit 132 controls, in Step S5, the communication unit 122 to receive the notice transmitted from the firmware management server 53 in response to the version-up request for the firmware 141.

In Step S6, the firmware management unit 132 judges whether or not the contents of the notice are to show that the version-up of the firmware 141 fails to be performed due to no support contract or the illegal firmware version information 151.

For instance, in the Step S6, if the notice is that transmitted by the processing in the above Step S25 or S27, that is, the contents of the notice are to show that the version-up of the firmware 141 fails to be performed due to no support contract or the illegal firmware version information 151, the processing is followed by Step S7. In the Step S7, the firmware management unit 132 supplies, to the POS register 102 through the interface unit 125, acknowledgement of the notice showing that the version-up of the firmware 141 fails to be performed due to no support contract or the illegal firmware version information 151. In accordance with this processing, the POS register 102 displays, on the display unit 172, information showing that the version-up of the firmware 141 fails to be performed due to no support contract or the illegal firmware version information 151, leading to the end of the processing.

In the Step S6, if the contents of the notice are neither to show that the version-up of the firmware 141 fails to be performed due to no support contract, nor to show that the firmware version information 151 is illegal, in the Step S8, the firmware management unit 132 judges whether or not the contents of the notice are to show that no version-up is needed.

If, in the Step S8, the notice is that transmitted by the processing in the Step S29, and its contents are to show that no version-up is needed, in the Step S9, the firmware management unit 132 supplies, to the POS register 102 through the interface unit 125, information showing that no version-up of the firmware 141 is needed. In accordance with this processing, the POS register 102 displays the information showing that no version-up of the firmware 141 is needed, leading to the end of the processing.

If, in the Step S8, the contents of the notice are to show the latest version firmware 231 in the form of binary data transmitted by the processing in the Step S30, in the Step S10, the firmware management unit 132 controls the communication unit 122 to acquire the firmware 231 transmitted together with the latest version information 221a, and at the same time, controls the firmware update unit 132a to update the firmware 141 in the storage unit 124 with the firmware 231.

In Step S11, the firmware management unit 132 controls the version information update unit 132b to update the firmware version information 151 in the security area 142 of the storage unit 124 with the latest version information 221a of the updated firmware 231, and the processing goes back to the Step S51. At this time, the firmware version information 151 contains information, such as the time of sending of the firmware version-up request, transmitted together with the latest version information 221a.

With the above processing, it becomes possible to restrain the firmware version information 151 from being falsified by the user of the terminal device 101 on the grounds that the firmware version information 151 is stored in the security area 142 of the storage unit 124, resulting in achievement of prevention of illegal firmware version-up. It also becomes possible to grasp the firmware version-up condition for each device ID, that is, for each terminal device 101 on the grounds that the firmware 231 is updated with the firmware management DB shown in FIG. 4. As a result, a grasp of the version-up condition enables accurate collection of compensation involved in the firmware version-up.

The above has been described as related to one embodiment adapted to manage the firmware version information 151 in the security area 142 included in the storage unit 124. However, the firmware version information has only to be stored so as to inhibit the stored version information from being falsified by the user of the terminal device 101. Thus, it is also allowable to perform management of the firmware version information in the form of an electronic certificate, for instance.

Configurations of the terminal device 101 and the firmware management server 53 both adapted to management of the firmware version information in the form of the electronic certificate are described with reference to FIG. 5. It is noted that for the terminal device 101 and the firmware management server 53 shown in FIG. 5, the similar configurations as those of the terminal device 101 and the firmware management server 53 shown in FIG. 2 are given the same numerals, and their descriptions are omitted at need.

Figure 5:
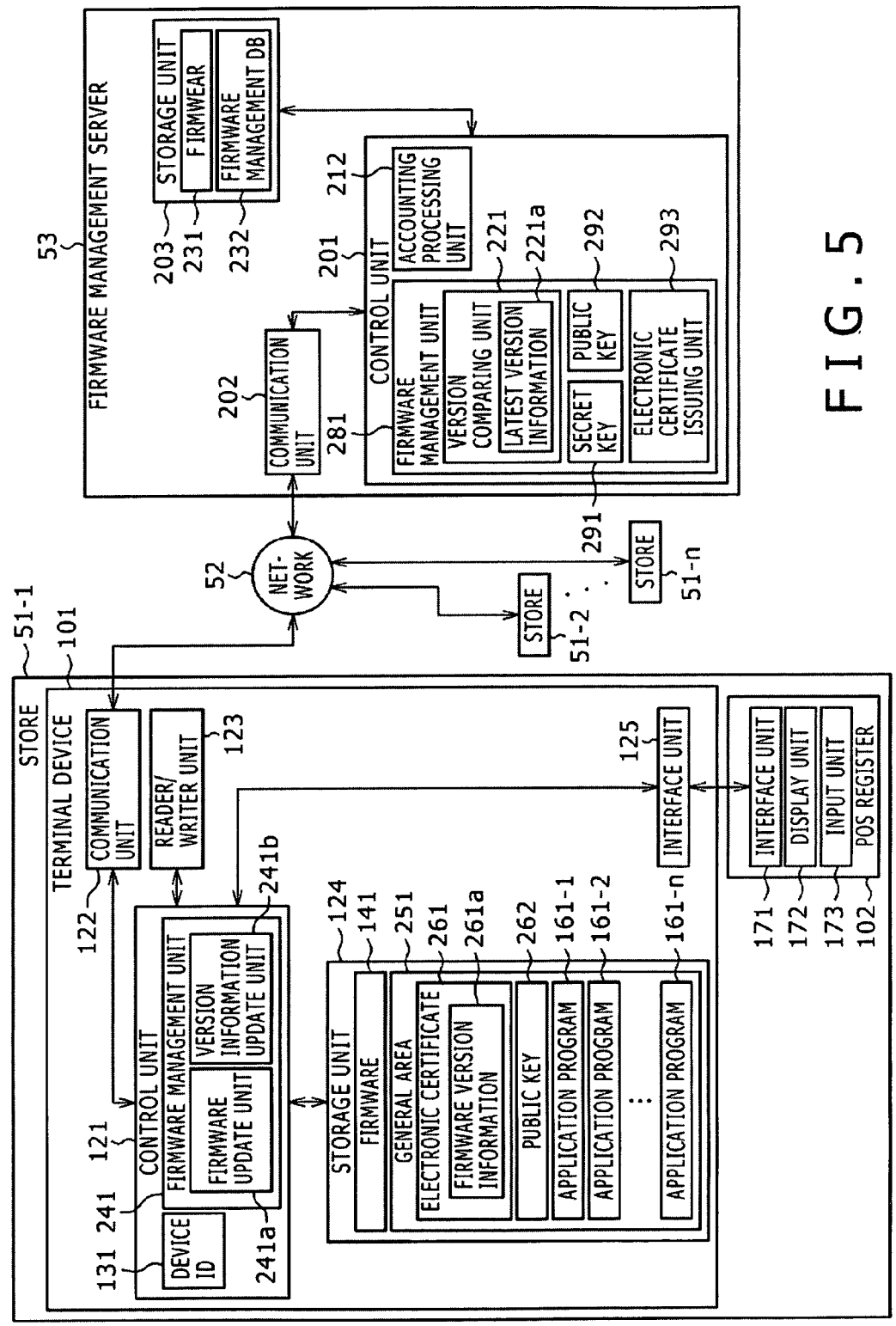
FIG. 5 is a view showing a different embodiment of the firmware management system to which the present invention is applied.

The terminal device 101 shown in FIG. 5 is different from the terminal device 101 shown in FIG. 2 in that the former has a firmware management unit 241 as the substitute for the firmware management unit 132. Further, with respect to the storage unit 124 in the former, there is no security area 142, and an area is wholly provided as a general area 251 adaptable to be given a description by the user. Furthermore, the general area 251 contains an electronic certificate 261 including the firmware version information 261a, together with the public key 262. The firmware management server 53 shown in FIG. 5 is different from the firmware management server 53 shown in FIG. 2 in that the former has a firmware management unit 281 as the substitute for the firmware management unit 211.

The firmware management unit 241 has the firmware update unit 241a and the version information update unit 241b, and provides the same basic function as that of the firmware management unit 132. Further, the version information update unit 241b acquires the electronic certificate 261 including the firmware version information 261a encrypted (electronically signed) with the secret key 291 attached to the firmware transmitted from the firmware management server 53 shown in FIG. 5, followed by storing the acquired electronic certificate in the general area 251 of the storage unit 124. The electronic certificate 261 includes the electronically signed firmware version information 261a (encrypted with the secret key 291 of the firmware management server 53). In other words, the electronic certificate 261 is really the firmware version information in itself.

To recognize the firmware version information 261a stored in the form of the electronic certificate 261, the firmware management unit 241 acquires the firmware version information 261a of the actual firmware 141 by decoding, with the public key 262 making a pair with the secret key 291, the firmware version information 261a encrypted with the secret key 291 of the firmware management server 53, and causes the acquired firmware version information to be displayed on the display unit 172 of the POS register 102.

Further, the firmware management unit 241 controls the communication unit 122 to transmit the electronic certificate 261 together with the device ID 131 to the firmware management server 53 when the version-up of the firmware 141 is requested.

While the firmware management unit 281 basically has the similar function as that of the firmware management unit 211, the secret key 291, the public key 292 corresponding to the secret key 291 and an electronic certificate issuing unit 293 are included, in addition to the version comparing unit 221. The electronic certificate issuing unit 293 issues the electronic certificate of the firmware version information after encryption (electronic signature) of the firmware version information of the firmware 231 with the secret key 291 when the version-up is performed by transmitting the firmware 231 to the terminal device 101. The firmware management unit 281 also reads out the firmware version information 261a after decoding, with the public key 292, the electronic certificate 261 supplied together with the firmware version-up request when the version-up of the firmware is requested.

That is, the firmware version information is basically distributed in the form of the electronic certificate 261 encrypted with the secret key 291. Thus, even if the firmware version information 261a is falsified by decoding with the public key 262, it is not possible to distribute the falsified firmware version information 261a as the electronic certificate after re-encryption with the secret key 291 because the user of the terminal device 101 has no secret key 291 corresponding to the public key 262, resulting in a difficulty in falsifying the firmware version information 261a.

Figure 6:
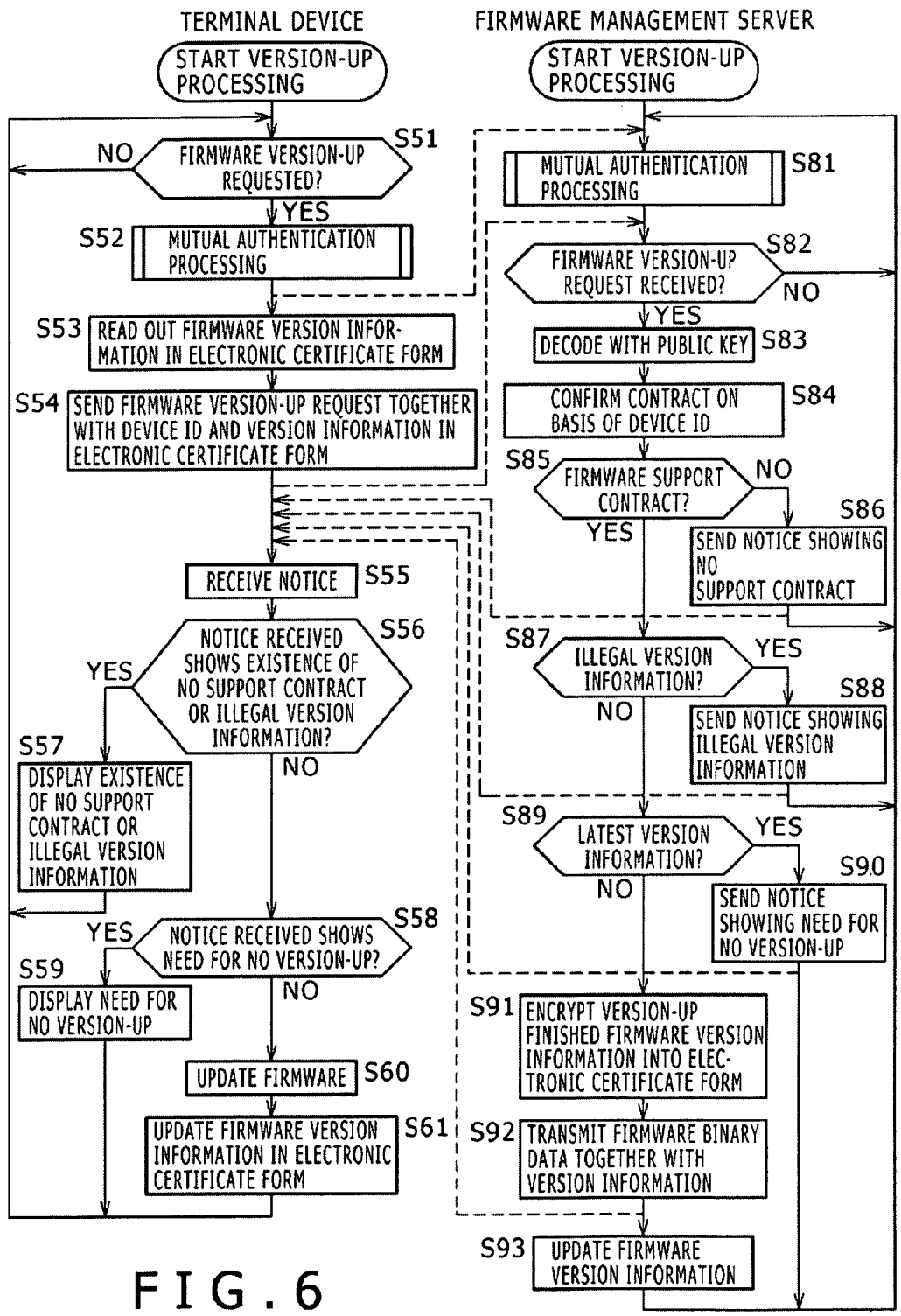
FIG. 6 is a flowchart for illustrating version-up processing with the firmware management system shown in FIG. 5.

Version-up processing with the firmware management system shown in FIG. 5 is now described with reference to a flowchart in FIG. 6. It is noted that processing in Steps S51, S52, S55 to S59, S81, S82 and S84 to S90 are processing similar to those in the Steps S1, S2, S5 to S9, S21, S22 and S23 to S29 in FIG. 3, so that their descriptions are omitted.

In Step S53, the firmware management unit 241 performs access to the general area 251, which is set up in the storage unit 124, to read out the electronic certificate 261 including the present firmware version information 261a from the general area 251.

In Step S54, the firmware management unit 241 controls the communication unit 122 to send the firmware version-up request to the firmware management server 53 through the network 52, after appending the device ID 131 for identification of the terminal device 101 to the read-out electronic certificate 261.

In Step S82, if the firmware version-up request by the processing in the Step S54 has been received, for instance, the processing is followed by Step S83.

In the Step S83, the control unit 201 controls the firmware management unit 281 to read out the firmware version information 261a of the firmware 141 of the terminal device 101 presenting the firmware version-up request, after decoding, with the public key 292, the electronic certificate 261 transmitted together with the firmware version-up request when the firmware version-up is requested.

In Step S84, the firmware management unit 281 accesses to the firmware management DB 232 stored in the storage unit 203 to read out and confirm, on the basis of the device ID 131 transmitted together with the firmware version-up request, contract information concerning the terminal device 101 making the firmware version-up request.

If it is presumed in Step S85 that no support contract is included, for instance, in Step S86, the control unit 201 controls the communication unit 202 to send, to the terminal device 101, a notice showing that the version-up request fails to be accepted due to no support contract, and the processing goes back to the Step S81.

On the other hand, if it is presumed in the Step S85 that the support contract is included, for instance, the processing is advanced to Step S87. In the Step S87, the firmware management unit 281 judges, by comparing the firmware version information 261a included in the electronic certificate 261 transmitted from the terminal device 101 with the version information read out from the firmware management DB 232, whether or not illegality is included.

In the Step S87, if the firmware version information 261a included in the electronic certificate 261 transmitted from the terminal device 101 is not identical with the version information read out from the firmware management DB 232, the firmware management unit 281 presumes that the firmware version information 261a is illegal, and the processing goes to Step S88. In the Step S88, the firmware management unit 281 controls the communication unit 202 to send, to the terminal device 101, a notice showing that the firmware version-up request fails to be accepted due to the illegal firmware version information 261*a*, and the processing goes back to the Step S81.

On the other hand, in the Step S87, if the firmware version information 261*a* included in the electronic certificate 261 transmitted from the terminal device 101 is identical with the version information read out from the firmware management DB 232, in other words, the firmware version information 261*a* is not illegal, the processing goes to Step S89. In Step S89, the firmware management unit 281 controls the version comparing unit 221 to judge, by comparing the firmware version information 261*a* transmitted from the terminal device 101 with the latest version information 221*a*, whether or not the firmware version information 261*a* is of the latest.

If it is presumed in the Step S89 that the firmware version information 261*a* is of the latest, for instance, in Step S90, the control unit 201 controls the communication unit 202 to send, to the terminal device 101 making the firmware version-up request, a notice showing that no firmware version-up is needed, in other words, no firmware needs to be updated, and the processing goes back to the Step S81.

On the other hand, if it is presumed in the Step S89 that the firmware version information 261*a* is not of the latest, for instance, in Step S91, the firmware management unit 281 performs access to the storage unit 203 to read out the stored latest firmware 231 in the form of binary data. The electronic certificate issuing unit 293 issues a new electronic certificate of the firmware version information by encrypting, with the secret key 292, the latest version information 221*a* specified as the version information of the read-out firmware 231. At this time, the electronic certificate issuing unit 293 performs issuance of the new electronic certificate of the firmware version information by encrypting, with the secret key 292, the latest version information 221*a* and information such as the time of acceptance of the firmware version-up request, together with the latest firmware 231 in the form of binary data.

In Step S92, the firmware management unit 281 controls the communication unit 202 to send, to the terminal device 101 making the firmware version-up request, the newly issued electronic certificate together with the firmware 231 in the form of binary data.

In Step S93, the firmware management unit 281 accesses to the storage unit 203 to update the firmware management DB 232 in accordance with the version-up of the firmware 141, and the processing goes back to the Step S81.

By the way, with respect to the terminal device 101, the firmware management unit 241 controls, in Step S55, the communication unit 122 to receive the notice transmitted from the firmware management server 53 in response to the version-up request for the firmware 141.

In Step S56, the firmware management unit 241 judges whether or not the contents of the notice are to show that the version-up of the firmware 141 fails to be performed due to no support contract or the illegal firmware version information 151.

If, in Step S56, the contents of the notice are to show that the version-up of the firmware fails to be performed due to no support contract or the illegal firmware version information 151 (the illegal electronic certificate 261), for example, the processing goes to Step S57. In the Step S57, the firmware management unit 241 supplies, to the POS register 102 through the interface unit 125, acknowledgement of the notice showing that the version-up of the firmware 141 fails to be performed due to no support contract or the illegal firmware version information 261*a* (the illegal electronic certificate 261). In accordance with this processing, the POS register 102 displays, on the display unit 172, information showing that the version-up of the firmware 141 fails to be performed due to no support contract or the illegal firmware version information 261*a* (the illegal electronic certificate 261), leading to the end of the processing.

On the other hand, if, in the Step S56, the contents of the notice are neither to show that the version-up of the firmware 141 fails to be performed due to no support contract nor to show that the firmware version information 151 is illegal, the processing is advanced to Step S58. In the Step S58, the firmware management unit 241 judges whether or not the contents of the notice are to show that no version-up is needed.

If, in the Step S58, the contents of the notice are to show that no version-up is needed, for instance, the processing is followed by Step S59. In the step S59, the firmware management unit 241 supplies, to the POS register 102 through the interface unit 125, information showing that no version up of the firmware 141 is needed. In accordance with this processing, the POS register 102 displays the information showing that no version-up of the firmware 141 is needed, leading to the end of the processing.

If, in the Step S58, the notice is that transmitted by the processing in the Step S92, and its contents are to show the latest version firmware 231 in the form of binary data, the processing is advanced to Step S60. In the Step S60, the firmware management unit 241 controls the communication unit 122 to acquire the transmitted firmware 231, and at the same time, controls the firmware update unit 241*a* to update the firmware 141 in the storage unit 124 with the firmware 231.

In Step S61, the firmware management unit 241 controls the version information update unit 241*b* to perform updating of the firmware version information 261*a* by updating the electronic certificate 261 in the general area 251 of the storage unit 124 with the electronic certificate transmitted together with the updated firmware 231, and the processing goes back to the Step S51.

With the above processing, it becomes possible to restrain the firmware version information 261*a* from being falsified by the user of the terminal device 101 on the grounds that the version information is stored in the form of the electronic certificate in the general area 251 of the storage unit 124, resulting in achievement of prevention of the illegal firmware version-up. Further, like the previously described case, it also becomes possible to grasp the firmware update condition for each device ID, that is, for each terminal device 101 on the grounds that the firmware 231 is updated with the firmware management DB 232 shown in FIG. 4. In addition, a grasp of the firmware update condition enables accurate collection of compensation involved in the firmware version-up.

The above series of processing may be implemented by hardware or by software. For implementation of the series of processing by the software, a program contained in the software is installed from a program recording medium into a computer built in dedicated hardware or into a computer such as general-purpose personal computers capable of performing various functions by installation of various programs, for instance.

FIG. 7 is a block diagram showing one hardware configuration of a personal computer adapted to perform the above series of processing on the basis of a program.

In the computer, a Central Processing Unit (CPU) 1001, a Read Only Memory (ROM) 1002 and a Random Access Memory (RAM) 1003 are interconnected through a bus 1004.

An input/output interface 1005 is also connected to the bus 1004. To the input/output interface 1005 are connected an input unit 1006 configured with a keyboard, a mouse and a microphone, etc., an output unit 1007 configured with a display and a speaker, etc., a storage unit 1008 configured with a hard disk and a non-volatile memory, etc., a communication unit 1009 configured with a network interface, etc., and a drive 1010 adapted to drive a removable media 1011 such as magnetic disks, optical discs, magneto-optical discs and semiconductor memories.

In the computer having the above configuration, the above series of processing is performed by allowing the CPU 1001 to execute a program stored in the storage unit 1008 after loading into the RAM 1003 through the input/output interface 1005 and the bus 1004.

The program to be executed by the computer (the CPU 1001) is provided by recording into the removal media 1011 included in package media such as magnetic disks (including flexible disks), optical discs (CD-ROMs (Compact Disc-Read Only Memories), DVDs (Digital Versatile Discs), or alternatively, through wired or wireless transmission mediums such as local area networks, the internet and digital satellite broadcasting.

The program may be installed into the storage unit 1008 through the input/output interface 1005 by mounting the removable media 1011 into the drive 1010. Alternatively, the program may be received by the communication unit 1009 through the wired or wireless transmission medium for installation into the storage unit 1008. Otherwise, preliminary installation of the program into the ROM 1002 or the storage unit 1008 is also possible.

It is noted that the program to be executed by the computer may be those adaptable to perform the processing in time series according to the sequence described in the present specification, or those adaptable to perform the processing in parallel or according to timing such as those required at the time when a call is made.

In the present specification, what is meant by the term of the system is an overall system composed of more than one apparatus or means etc.

According to one aspect of the present invention, it becomes possible to accurately manage the firmware update condition of the terminal devices connected through the network.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2007-012898 filed in the Japanese Patent Office on Jan. 23, 2007, the entire contents of which being incorporated herein by reference.

What is claimed is:

1. A management system having a terminal device and a management server for managing terminal firmware of the terminal device, wherein:
the terminal device includes:
storing means which stores the firmware to be capable of being updated by a user of the terminal device, and stores version information of the firmware to be incapable of being updated by the user;
firmware updating means which updates, on the basis of the version information, the firmware stored in the storing means with newer version firmware transmitted from the management server; and
version information updating means which updates the version information stored in the storing means with the version information of the firmware updated by the firmware updating means; and
a control unit that controls a transmitting means of the management server, wherein the control unit is configured to transfer the newer version firmware between the terminal device and the management server via the transmitting means, wherein
the management server includes:
judging means which judges, on the basis of the version information of the terminal firmware transmitted from the terminal device, a need or not to update the firmware; and
the transmitting means which transmits the newer version firmware to the terminal device if it is judged by the judging means that the firmware needs to be updated.

2. The management system according to claim 1, wherein:
the storing means stores the firmware version information in a security area where updating of the version information by the user of the terminal device is inhibited, and
the version information updating means updates the version information stored in the security area of the storing means with the version information of the firmware updated by the firmware updating means.

3. The management system according to claim 1, wherein:
the management server allows the transmitting means to transmit the version information of the firmware, which is aimed at being transmitted, to the terminal device together with the firmware, after encryption with a secret key, if it is judged by the judging means that the firmware needs to be updated, and
the terminal device allows the version information updating means to update the version information of the firmware with the encrypted version information, and also allows the storing means to store, by storing the version information in the encrypted state, the version information so as to inhibit the stored version information from being updated by the user of the terminal device.

4. The management system according to claim 1, wherein the control unit of the terminal device is configured to allow application programs stored in a general area of the storage means to be executed on the firmware.

5. The management system according to claim 1, wherein the management server further includes a management server control unit configured to control operation of the management server.

6. The management system according to claim 5, wherein the judging means is included in the management server control unit, and wherein the management server control unit further includes a firmware management unit configured to access a firmware management database to determine whether there is a contract to distribute the newer version firmware.

7. The management system according to claim 6, wherein the firmware management unit is configured to control the judging means to compare the newer version firmware with the firmware version information.

8. The management system according to claim 6, wherein the newer version firmware is stored in a storage unit of the management server, and wherein if the newer version firmware is not identical to the firmware version information, the firmware management unit is configured to access the storage unit to transfer the newer version firmware to the terminal device.

9. A management method of a management system having a terminal device and a management server for managing firmware of the terminal device, wherein:
the management method includes for managing the terminal apparatus:
a storing step of storing the firmware to be capable of being updated by a user of said terminal device, and storing version information of the firmware to be incapable of being updated by said user;
a firmware updating step of updating, on the basis of the version information, the firmware stored by processing in the storing step with newer version firmware transmitted from the management server;
a version information updating step of updating the version information stored by processing in the storing step with the version information of the firmware updated by processing in the firmware updating step; and
controlling transfer of the newer version firmware between the terminal device and the management server via a transmitting means, and
the management method includes for managing the management server:
a judging step of judging, on the basis of the version information of the terminal firmware transmitted from the terminal device, a need or not to update the firmware, and a transmitting step of transmitting the newer version firmware to the terminal device if it is judged by processing in the judging step that the firmware needs to be updated.

10. The management method according to claim 9, further comprising executing application programs stored in a general area of the storage means on the firmware.

11. The management method according to claim 9, further comprising accessing a firmware management database of the management server, and determining whether there is a contract to distribute the newer version firmware.

12. The management method according to claim 11, further comprising controlling the judging means to compare the newer version firmware with the firmware version information.

13. The management method according to claim 12, further comprising accessing a storage unit and transferring the newer version firmware to the terminal device unless the newer version firmware is identical to the firmware version information.

14. A program stored on non-transitory computer readable medium, the program causing, among computers for controlling a management system having a terminal device and a management server for managing firmware of the terminal device:
a computer for controlling the terminal device to perform processing including:
a storing step of storing the firmware to be capable of being updated by a user of the terminal device, and storing version information of the firmware to be incapable of being updated by the user;
a firmware updating step of updating, on the basis of the version information, the firmware stored by processing in the storing step with newer version firmware transmitted from the management server;
a version information updating step of updating the version information stored by processing in the storing step with the version information of the firmware updated by processing in the firmware updating step, and
controlling transfer of the newer version firmware between the terminal device and the management server via a transmitting means, and
a computer for controlling the management server to perform processing including:
a judging step of judging, on the basis of the version information of the terminal firmware transmitted from the terminal device, a need or not to update the firmware, and
a transmitting step of transmitting the newer version firmware to the terminal device if it is judged by processing in the judging step that the firmware needs to be updated.

15. A terminal device, comprising:
storing means which stores firmware to be capable of being updated by a user of one's own terminal device, and stores version information of the firmware to be incapable of being updated by the user;
firmware updating means which updates, on the basis of the version information, the firmware stored in the storing means with newer version firmware transmitted from a management server;
version information updating means which updates the version information stored in the storing means with the version information of the firmware updated by the firmware updating means; and
a control unit that controls a transmitting means of the management server, wherein the control unit is configured to transfer the newer version firmware between the terminal device and the management server via the transmitting means.

16. The terminal device according to claim 15, wherein the control unit of the terminal device is configured to allow application programs stored in a general area of the storage means to be executed on the firmware.

17. A management server comprising:
judging means which judges, on the basis of version information of terminal firmware transmitted from a terminal device, a need or not to update the firmware; and
transmitting means which transmits newer version firmware to the terminal device if it is judged by the judging means that the firmware needs to be updated; wherein
the management server is configured to manage terminal firmware of a terminal device having storing means and a control unit, wherein the storing means stores the firmware to be capable of being updated by a user of the terminal device, and stores version information of the firmware to be incapable of being updated by the user, and wherein the control unit controls the transmitting means and is configured to transfer the newer version firmware between the terminal device and the management server via the transmitting means.

18. The management server according to claim 17, further comprising a management server control unit configured to control operation of the management server, wherein the management server control unit comprises:
the judging means;
a storage unit storing the newer version firmware and having a firmware management database; and
a firmware management unit configured to access the firmware management database to determine whether there is a contract to distribute the newer version firmware.

19. The management server according to claim 18, wherein the firmware management unit is configured to control the judging means to compare the newer version firmware with the firmware version information.

20. The management system according to claim 18, wherein if the newer version firmware is not identical to the firmware version information, the firmware management unit is configured to access the storage unit to transfer the newer version firmware to the terminal device.

\* \* \* \* \*